(12) United States Patent
Ma et al.

(10) Patent No.: US 11,708,913 B2
(45) Date of Patent: Jul. 25, 2023

(54) VALVE

(71) Applicant: ILLINOIS TOOL WORKS INC., Glenview, IL (US)

(72) Inventors: Yue Ma, Shanghai (CN); Ziteng Zheng, Shanghai (CN); Michael Henker, Shanghai (CN)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/241,264

(22) Filed: Apr. 27, 2021

(65) Prior Publication Data

US 2021/0332893 A1    Oct. 28, 2021

(30) Foreign Application Priority Data

Apr. 27, 2020 (CN) .......................... 202010344643.3
Apr. 9, 2021 (CN) .......................... 202110381860.4

(51) Int. Cl.
*F16K 5/04* (2006.01)
*F16K 31/53* (2006.01)
*H01M 10/6556* (2014.01)
*B60L 58/26* (2019.01)
*H01M 10/613* (2014.01)

(52) U.S. Cl.
CPC .......... *F16K 5/0407* (2013.01); *F16K 5/0414* (2013.01); *F16K 5/0442* (2013.01); *F16K 5/0478* (2013.01); *F16K 31/535* (2013.01); *B60L 58/26* (2019.02); *H01M 10/613* (2015.04); *H01M 10/6556* (2015.04)

(58) Field of Classification Search
CPC .... F16K 5/0478; F16K 5/0407; F16K 5/0442; F16K 5/0414; F16K 31/535; F16K 5/204; F16K 1/523; H01M 10/613; H01M 10/6556; H01M 10/60–667; H01M 8/04014; H01M 8/04225; H01M 8/04097; B60L 58/26; Y02E 60/50
USPC .. 251/359–365, 208, 209, 298, 315.07, 345, 251/192, 177, 315.01, 249.5; 429/17, 24, 429/34, 35
See application file for complete search history.

(56) References Cited

U.S. PATENT DOCUMENTS

| 596,000 | A | * | 12/1897 | Heston | ..................... F16K 5/162 251/160 |
| 1,656,183 | A | * | 1/1928 | Enz | ......................... F16K 1/221 251/56 |
| 2,114,789 | A | * | 4/1938 | Urquhart | ............... F16K 5/0278 251/333 |

(Continued)

*Primary Examiner* — Craig J Price
(74) *Attorney, Agent, or Firm* — Quarles & Brady LLP

(57) ABSTRACT

A valve includes a housing having a housing cavity and at least two housing openings. A valve body is rotatably provided in the housing cavity and includes a valve body top portion, a valve body bottom portion and a valve body sidewall. The valve body sidewall has an upper valve body sidewall and a lower valve body sidewall which are connected to each other. An outer surface of the upper valve body sidewall is a partial cylindrical surface, and an outer surface of the lower valve body sidewall is shaped to have a gradually decreasing diameter in a direction from top to bottom. A seal is provided on the valve body sidewall and the seal is configured to match with the housing to enable the valve body sidewall to close at least one of the housing openings.

12 Claims, 12 Drawing Sheets

(56) References Cited

U.S. PATENT DOCUMENTS

| | | | | |
|---|---|---|---|---|
| 2,194,261 | A * | 3/1940 | Herbert | F16K 3/12 251/328 |
| 2,247,773 | A * | 7/1941 | Dunn | F16K 15/03 137/527.4 |
| 2,401,377 | A * | 6/1946 | Smith | F16K 3/12 251/327 |
| 2,655,942 | A * | 10/1953 | Dougherty | F16K 1/24 251/163 |
| 3,284,046 | A * | 11/1966 | Allenbaugh, Jr. | F16K 5/0684 251/315.08 |
| 3,379,408 | A * | 4/1968 | Lowrey | F16K 5/204 251/298 |
| 3,521,659 | A * | 7/1970 | Seger | F16K 15/033 251/298 |
| 3,528,448 | A * | 9/1970 | Urban | F16K 5/208 137/242 |
| 3,552,434 | A * | 1/1971 | Haenky | F16K 5/08 251/285 |
| 3,893,469 | A * | 7/1975 | Baker | F16K 5/0626 137/584 |
| 3,904,171 | A * | 9/1975 | Chronister | F16K 31/528 251/159 |
| 4,074,889 | A * | 2/1978 | Engel | F16K 1/2028 251/298 |
| 4,193,580 | A * | 3/1980 | Norris | F16K 5/0407 251/304 |
| 4,415,847 | A * | 11/1983 | Galloway | B60L 53/302 320/150 |
| 4,520,995 | A * | 6/1985 | Lew | F16K 1/225 251/188 |
| 4,634,098 | A * | 1/1987 | Varden | F16K 1/24 137/559 |
| 4,697,786 | A * | 10/1987 | Kennedy | F16K 1/24 251/309 |
| 4,698,886 | A * | 10/1987 | Kennedy | F16K 1/24 164/98 |
| 4,711,427 | A * | 12/1987 | Holtgraver | F16K 1/22 29/434 |
| 4,989,833 | A * | 2/1991 | Polon | F16K 5/0605 137/1 |
| 5,016,857 | A * | 5/1991 | Bovee | F16K 5/0605 251/209 |
| 5,111,839 | A * | 5/1992 | Schroepfer | F16K 5/201 137/240 |
| 5,186,433 | A * | 2/1993 | Pausch | F16K 5/204 251/298 |
| 5,618,026 | A * | 4/1997 | Geyer | F16K 1/24 251/298 |
| 5,624,003 | A * | 4/1997 | Matsuki | B60L 58/26 180/65.1 |
| 5,755,427 | A * | 5/1998 | Koskinas | F16K 5/204 251/188 |
| 5,947,443 | A * | 9/1999 | Shellenbarger | F16K 5/0478 251/181 |
| 6,276,664 | B1 * | 8/2001 | Keller | F02D 11/10 251/129.12 |
| 6,378,842 | B1 * | 4/2002 | Frese | F16K 27/067 251/315.12 |
| 6,471,182 | B1 * | 10/2002 | McIntosh | F16K 31/046 251/129.12 |
| 7,051,994 | B2 * | 5/2006 | Carlson | F16K 3/0245 251/162 |
| 7,182,314 | B2 * | 2/2007 | Harvey | F16K 1/221 251/129.11 |
| 7,192,004 | B2 * | 3/2007 | Chen | F16K 31/055 251/129.03 |
| 7,316,216 | B2 * | 1/2008 | Neise | F02D 9/1065 123/337 |
| 7,472,682 | B2 * | 1/2009 | Tanimura | F02D 9/1065 123/339.13 |
| 7,516,941 | B2 * | 4/2009 | Combs | F16K 5/0647 251/248 |
| 8,136,789 | B2 * | 3/2012 | Staev | F16K 31/04 251/129.12 |
| 8,398,055 | B2 * | 3/2013 | Yin | F16K 5/0605 251/214 |
| 8,714,518 | B2 * | 5/2014 | Combs | F16K 5/0647 251/64 |
| 9,458,939 | B2 * | 10/2016 | Hotta | F16K 1/224 |
| 9,803,764 | B2 * | 10/2017 | Chang | F16K 17/386 |
| 10,215,301 | B2 * | 2/2019 | Kwasniewski | F16K 31/535 |
| 10,385,984 | B2 * | 8/2019 | Geffert | F16K 31/12 |
| 10,563,777 | B2 * | 2/2020 | Han | F16K 1/205 |
| 10,641,399 | B2 * | 5/2020 | Fang | F16K 5/0605 |
| 10,683,940 | B1 * | 6/2020 | Quade | F16K 31/5245 |
| 10,808,850 | B2 * | 10/2020 | Abouelleil | F16K 5/0407 |
| 10,859,005 | B2 * | 12/2020 | Kim | F02D 9/02 |
| 11,073,213 | B2 * | 7/2021 | Nasu | F16K 1/221 |
| 11,112,015 | B2 * | 9/2021 | Chapman | F16K 5/0478 |
| 2009/0309056 | A1 * | 12/2009 | Tsai | F16K 1/222 251/231 |
| 2015/0217622 | A1 * | 8/2015 | Enomoto | B60H 1/00278 165/42 |
| 2017/0152957 | A1 * | 6/2017 | Roche | H01M 10/625 |
| 2017/0282258 | A1 * | 10/2017 | Ohno | B23B 51/105 |
| 2020/0109787 | A1 * | 4/2020 | Tsuji | F01P 11/04 |

* cited by examiner

VALVE

CROSS REFERENCES TO RELATED APPLICATIONS

This application claims the benefit of Chinese Patent Application No. 202010344643.3, filed on Apr. 27, 2020, and Chinese Patent Application No. 202110381860.4, filed on Apr. 9, 2021, both of which are incorporated herein by reference in their entirety.

TECHNICAL FIELD

The present disclosure relates to a valve, and in particular to a coolant control valve for use inside a battery pack.

BACKGROUND

Battery packs of electric vehicles comprise a number of battery assemblies, and the temperature of the battery assemblies needs to be maintained within a certain range when the battery assemblies supply power to or charge an internal combustion engine. The existing battery packs further comprise a coolant channel, and a control valve or a temperature regulating valve can control the circulation of a coolant in the coolant channel, such that the temperature of the battery assemblies can be regulated.

SUMMARY OF THE DISCLOSURE

At least one object of the present disclosure is to provide a valve, comprising: a housing having a housing cavity and at least two housing openings, the at least two housing openings communicating with the housing cavity; a valve body rotatably provided in the housing cavity of the housing, wherein the valve body comprises a valve body top portion, a valve body bottom portion and a valve body sidewall, the valve body top portion is connected to a rotating shaft, the valve body sidewall is connected between the valve body top portion and the valve body bottom portion, the valve body sidewall extends circumferentially around an axis of the rotating shaft, and the valve body is configured to be capable of opening or closing at least one housing opening of the at least two housing openings by means of the valve body sidewall as the valve body rotates around the rotating shaft; and a seal provided on the valve body sidewall, the seal being configured to match with the housing such that the valve body sidewall is capable of sealing and closing the at least one housing opening of the at least two housing openings; wherein the valve body sidewall comprises an upper valve body sidewall and a lower valve body sidewall which are connected to each other, the upper valve body sidewall is connected to the valve body top portion, and the lower valve body sidewall is connected to the valve body bottom portion; and wherein an outer surface of the upper valve body sidewall is a partial cylindrical surface, and an outer surface of the lower valve body sidewall is shaped to have a gradually decreasing diameter in a direction from top to bottom.

According to the above content, the housing has a housing bottom portion and a housing sidewall, the housing sidewall defines the housing cavity, the housing openings are provided in the housing sidewall, a bottom of the housing sidewall is connected to the housing bottom portion, a top of the housing sidewall forms a mounting port communicating with the housing cavity, and the valve body is mounted in the housing cavity via the mounting port; wherein the housing sidewall comprises an upper housing sidewall and a lower housing sidewall, the upper housing sidewall is provided above the lower housing sidewall, the housing sidewall is configured to have complementary shape with the valve body sidewall, and the seal is configured to be capable of abutting against the housing sidewall.

According to the above content, the valve further comprises at least two fluid pipelines, the at least two fluid pipelines being provided, corresponding to the housing openings, outside the housing, and being integrally formed with the housing.

According to the above content, the housing bottom portion is provided with a support shaft extending towards the housing cavity, the valve body bottom portion is provided with a shaft hole for receiving the support shaft, and the support shaft and the rotating shaft are coaxially arranged.

According to the above content, the seal is integrally formed on the valve body sidewall by means of an injection molding process.

According to the above content, the seal is an annular seal, which is shaped and dimensioned to be capable of enclosing the housing opening and abutting against the housing sidewall surrounding the housing opening when the valve body sidewall closes the housing opening.

According to the above content, the outer surface of the lower valve body sidewall is a partial spherical surface, and an inner surface of the lower housing sidewall is a hemispherical surface.

According to the above described, the valve body sidewall and the housing sidewall have uniform thickness.

According to the above content, the valve further comprises: an actuator mechanism comprising a transmission assembly, wherein the transmission assembly comprises: a worm configured to be connected to a driving shaft; a first gear having an upper gear and a lower gear which are capable of rotating synchronously, the number of teeth of the lower gear being less than that of the upper gear, and the upper gear engaging with the worm; and a second gear, the number of teeth of the second gear being greater than that of the lower gear, and the second gear engaging with the lower gear of the first gear; wherein the second gear is connected to the rotating shaft of the valve body to drive the rotating shaft to rotate.

According to the above content, the actuator mechanism further comprises a box-shaped part connected to and located above the housing, the transmission assembly being provided in the box-shaped part, and the rotating shaft passing through the box-shaped part for connection to the second gear, wherein a first sealing ring is provided between the rotating shaft and the box-shaped part, and a second sealing ring is provided between the second gear and the box-shaped part.

According to the above content, the valve further comprises: a valve cover welded on the mounting port of the housing to close the mounting port, wherein the box-shaped part is provided above the valve cover, and the rotating shaft of the valve body passes through the valve cover to extend into the case.

According to the above content, the bottom of the box-shaped part or the valve cover is connected to two stop walls which are capable of coming into contact with the top of the valve body, and the valve body top portion of the valve body rotates between the two stop walls.

BRIEF DESCRIPTION OF THE DRAWINGS

These and other features and advantages of the present disclosure may be better understood by reading the following detailed description with reference to the accompanying drawings. The same reference numerals represent the same components throughout the accompanying drawings, in which.

DETAILED DESCRIPTION OF EMBODIMENTS

Various specific embodiments of the present disclosure are described below with reference to the accompanying drawings which constitute part of this description. It should be understood that although the terms for indicating orientations, such as "front", "rear", "upper", "lower", "left", "right", "top", "bottom", "inner" and "outer", are used in the present disclosure to describe structural parts and elements in various examples of the present disclosure, these terms are used herein only for ease of illustration and are determined based on the exemplary orientations shown in the accompanying drawings. Since the embodiments disclosed in the present disclosure can be arranged in different directions, these terms for indicating orientations are only illustrative and should not be considered as limitations.

Figure 1:
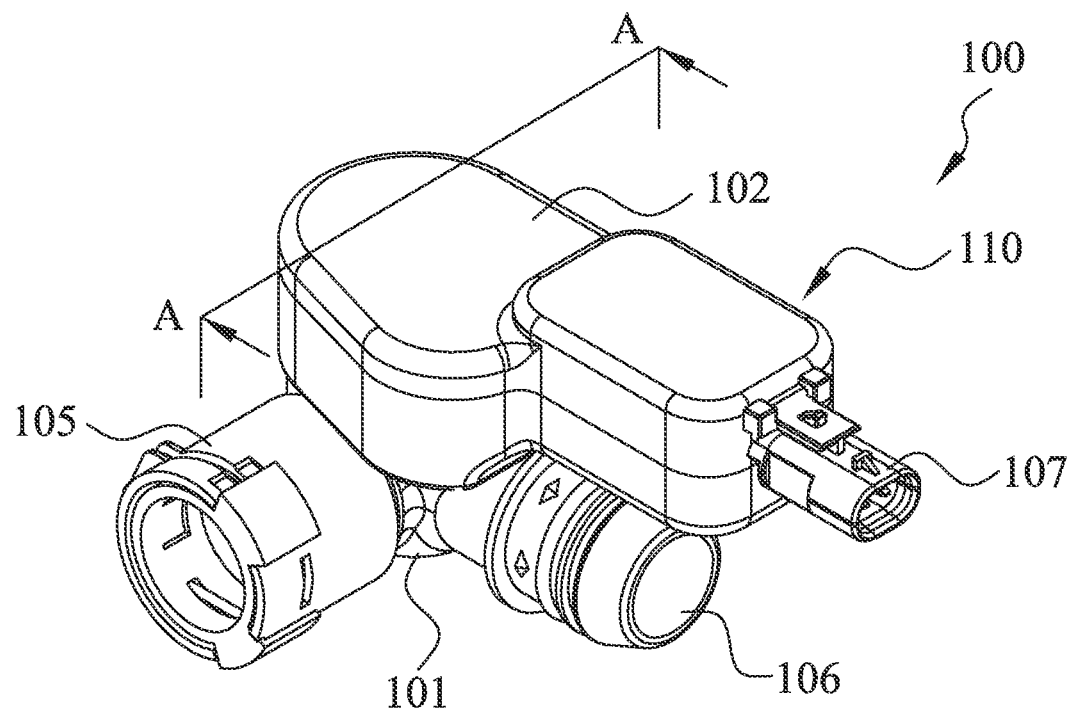
FIG. 1 is a structural perspective diagram of a valve according to an embodiment of the present disclosure.

FIG. 1 is a structural perspective diagram of a valve 100 according to an embodiment of the present disclosure, for illustrating an overall structure of the valve 100. As shown in FIG. 1, the valve 100 comprises a housing 101, a valve body 208 (see FIGS. 2A and 2B), and an actuator mechanism 110, the actuator mechanism 110 being located above the housing 101. The housing 101 has two fluid pipelines 105 and 106. The fluid pipeline 106 is an inlet pipeline for connection to a coolant source and the fluid pipeline 105 is an outlet pipeline for connection to a cooling channel inside a battery pack. As an example, the fluid pipelines 105 and 106 are integrally formed with the housing 101. The valve body 208 is rotatably provided in the housing 101, and may rotate to open the fluid pipeline 105 and the fluid pipeline 106, such that a coolant from the coolant source can flow into the valve 100 through the fluid pipeline 106 and can flow out of the valve 100 from the fluid pipeline 105 and enter the cooling channel inside the battery pack to regulate the temperature of battery assemblies (not shown) in the battery pack; or rotate to close the fluid pipeline 105 or the fluid pipeline 106 such that the coolant is disconnected from the cooling channel inside the battery pack. The actuator mechanism 110 comprises a box-shaped part 102, and an electric motor 550 and a transmission assembly 581 are provided in the box-shaped part 102, which will be shown in greater detail in the exploded diagrams of the actuator mechanism 110 in FIGS. 5A and 5B. The electric motor 550 and the transmission assembly 581 are configured to drive the valve body 208 to rotate. A communication connector 107 is connected to one side of the actuator mechanism 110 to transmit power and a control signal to the electric motor 550 in the actuator mechanism 110.

Figure 2A:
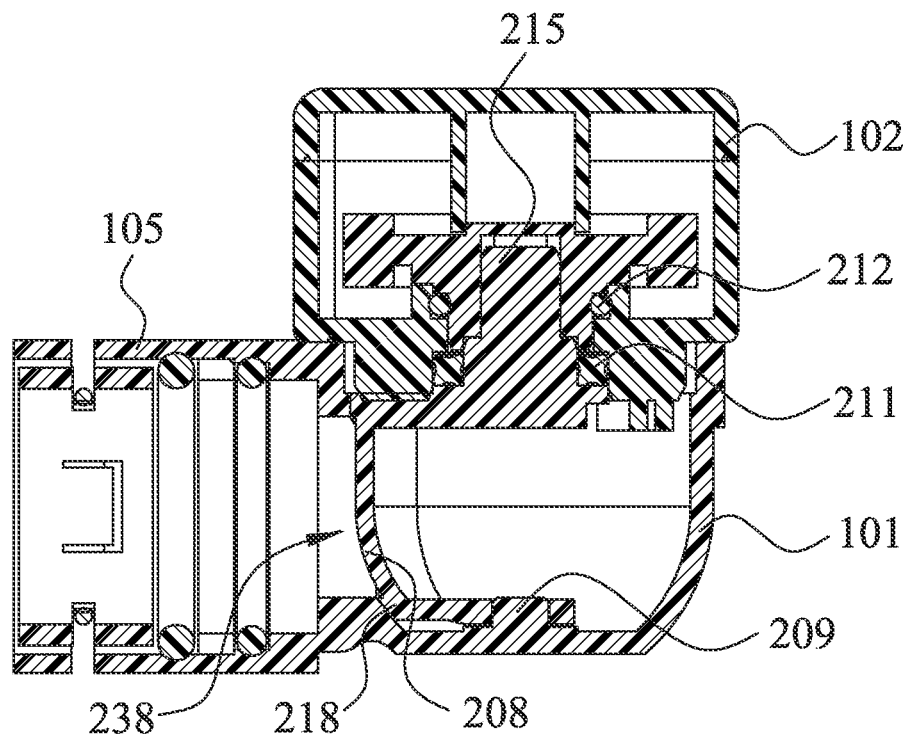
FIG. 2A is a cross-sectional view of the valve shown in FIG. 1 taken along line A-A.
Figure 2B:
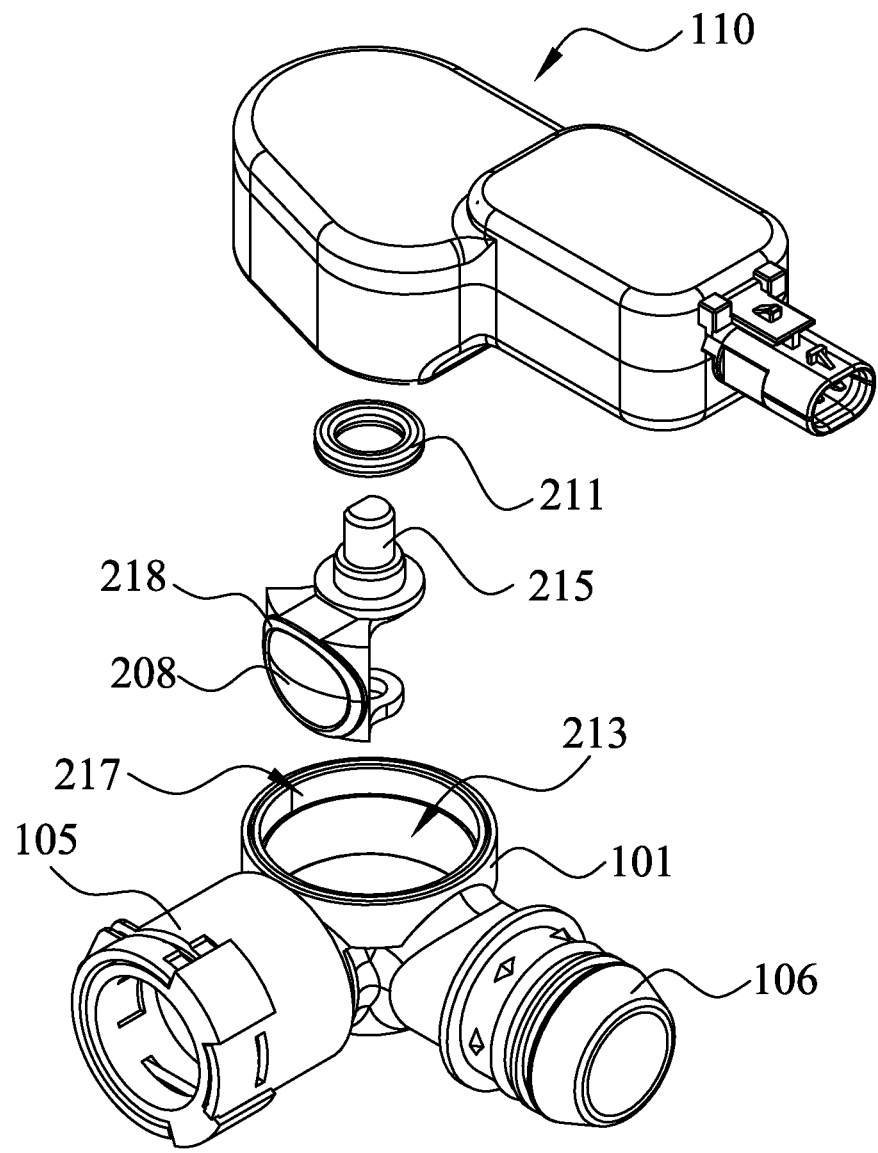
FIG. 2B is an exploded structural perspective diagram of the valve shown in FIG. 1.

FIG. 2A is a cross-sectional view of the valve 100 shown in FIG. 1 taken along line A-A, FIG. 2B is an exploded structural perspective diagram of the valve 100 shown in FIG. 1, and FIGS. 2A and 2B are intended to illustrate the internal structure of the valve 100.

As shown in FIGS. 2A and 2B, the housing 101 has a housing cavity 213, a top of the housing 101 has a mounting port 217 communicating with the housing cavity 213, and the valve body 208 is rotatably mounted in the housing cavity 213 via the mounting port 217. The fluid pipeline 105 and the fluid pipeline 106 can communicate with each other via the housing cavity 213. The housing 101 has a housing opening 238 communicating with the fluid pipeline 105. In this embodiment, the rotation of the valve body 208 may open or close the housing opening 238 corresponding to the fluid pipeline 105. In other embodiments, the rotation of the valve body 208 may also open or close a housing opening corresponding to the fluid pipeline 106. Specifically, the valve body 208 has an open position and a closed position, and is rotatable between the open position and the closed position. In the state shown in FIG. 2A, the valve body 208 is in the closed position, and the fluid pipeline 105 can be closed by blocking (or closing) the housing opening 238. The valve 100 further comprises a seal 218, and the seal 218 is provided on the valve body 208 and can abut against a housing sidewall surrounding the housing opening 238 (see the housing sidewall 433 in FIGS. 4A and 4B), thereby ensuring that the valve body 208 seals and blocks (or closes) the housing opening 238 and prevents liquid from flowing into the fluid pipeline 105 from a gap between the valve body 208 and the housing sidewall. In this way, in the case where the valve body 108 closes the housing opening 238 and the fluid pipeline 105, the coolant cannot flow out of the fluid pipeline 105 even if it flows from the fluid pipeline 106 into the valve 100.

A top of the valve body 208 is provided with a rotating shaft 215. A bottom of the housing 101 is provided with a support shaft 209 extending out towards the housing cavity 213, and the support shaft 209 is connected to a bottom of the valve body 208. The rotating shaft 215 and the support shaft 209 are provided coaxially, that is, the rotating shaft 215 and the support shaft 209 have a common axis about which the valve body 208 can rotate to close the housing opening 238 in its closed position or to open the housing opening 238 in its open position. In the example as shown in the figure, the rotating shaft 215 extends into the box-shaped part 102 of the actuator mechanism 110 and is received by the transmission assembly 581 (see FIG. 5A) of the actuator mechanism 110, thereby enabling the actuator mechanism 110 to drive the rotating shaft 215 to rotate. In order to prevent the coolant in the housing cavity 213 from seeping into the actuator mechanism 110, a first sealing ring 211 is provided at the connection of the rotating shaft 215 and the box-shaped part 102. Further, a second sealing ring 212 is also provided between a second gear 557 (see FIGS. 5A and 5B) in the transmission assembly 581 for receiving the rotating shaft 215 and the box-shaped part 102. In this embodiment, the first sealing ring 211 is an X-shaped sealing ring, and the second sealing ring 212 is an O-shaped sealing ring.

Figure 3A:
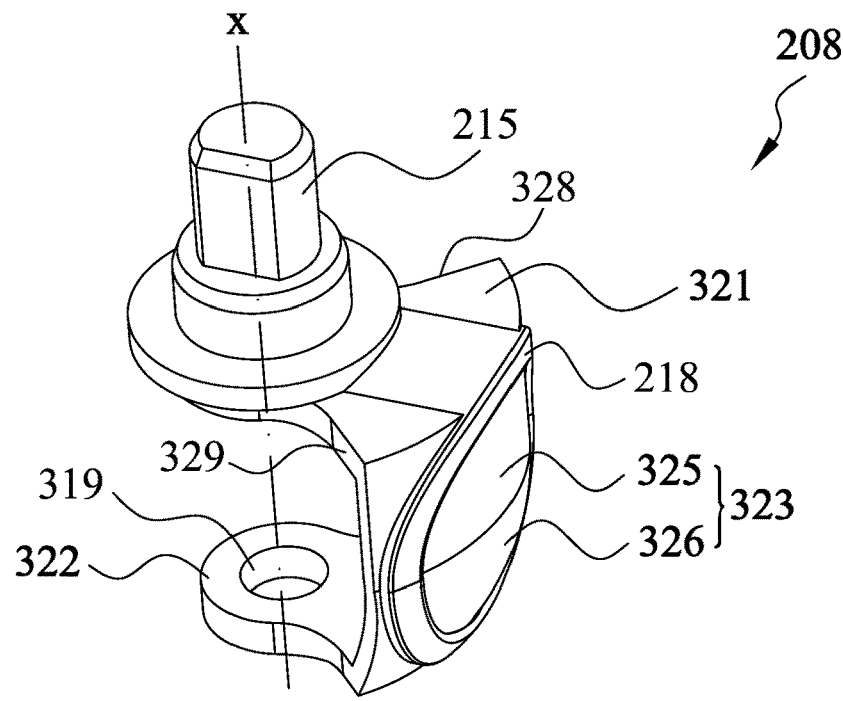
FIG. 3A is a structural perspective diagram of a valve body of the valve shown in FIG. 1.
Figure 3B:
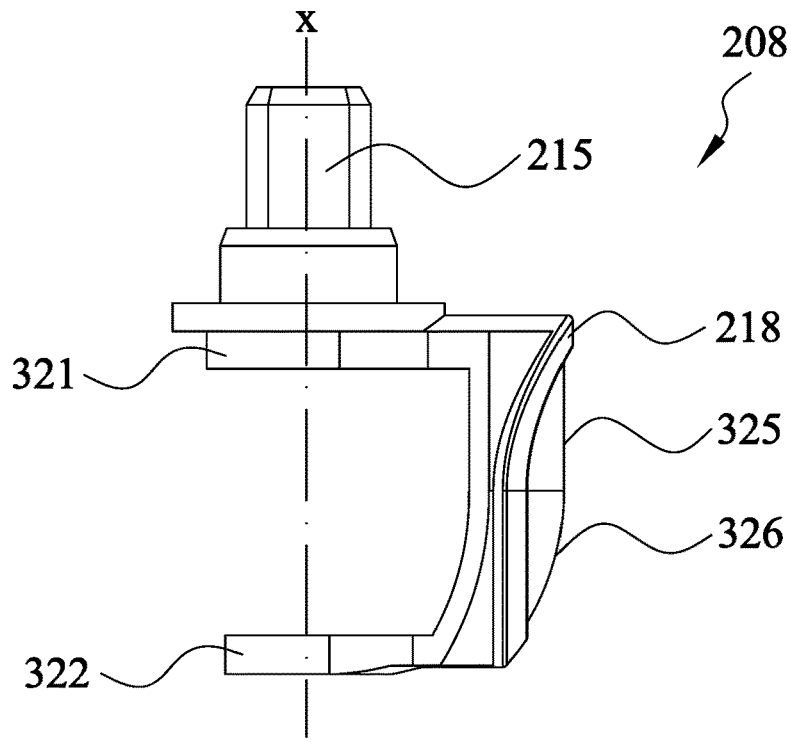
FIG. 3B is a front view of the valve body of FIG. 3A.

FIGS. 3A and 3B show the specific structure of the valve body 208, wherein FIG. 3A is a structural perspective diagram of the valve body 208 when viewed from the side, and FIG. 3B is a front view of FIG. 3A. As shown in FIGS. 3A and 3B, the valve body 208 comprises a valve body top portion 321, a valve body bottom portion 322, and a valve body sidewall 323. The rotating shaft 215 is connected to and located above the valve body top portion 321, and the valve body bottom portion 322 is provided with a support shaft hole 319 for accommodating the support shaft 209. The valve body top portion 321 and the valve body bottom portion 322 are substantially parallel to each other and have a generally fan-shaped outline, such as a fan shape with 90° angle range, two limiting sidewalls 328 and 329 are formed in two radius directions of the fan shape of the valve body top portion 321, and the two limiting sidewalls 328 and 329 are configured to form a limiting structure for confining the valve body 208 in the valve body closed position or the valve body open position.

The valve body sidewall 323 is connected between the valve body top portion 321 and the valve body bottom portion 322. The valve body sidewall 323 extends around a circumference of the axis x of the rotating shaft 215 by an angle, such as about 90°. That is, an outer surface of the valve body sidewall 323 has a arc shape in any cross-section perpendicular to the axis x. In order to facilitate machining and saving on materials, a thickness of the valve body sidewall 323 is uniform, that is, the outer surface and an inner surface of the valve body sidewall 323 have substantially the same shape. The valve body sidewall 323 comprises an upper valve body sidewall 325 connected to the valve body top portion 321 and a lower valve body sidewall 326 connected to the valve body bottom portion 322. The upper valve body sidewall 325 and the lower valve body sidewall 326 are smoothly connected to each other in the middle of the valve body sidewall 323, and the upper valve body sidewall 325 is connected to and located above the lower valve body sidewall 326. Specifically, the upper valve body sidewall 325 is substantially a cylindrical straight wall extending vertically from an outer edge of the valve body top portion 321 towards the valve body bottom portion 322. A bottom of the upper valve body sidewall 325 smoothly contracts and extends inwardly in the direction of the axis x and is connected to an edge of the valve body bottom portion 322 to form the lower valve body sidewall 326. That is, in an axial cross-section passing through the valve body sidewall 323 and the axis x of the rotating shaft 215, the distance from the outer surface of the upper valve body sidewall 325 to the axis is constant, while the outer surface of the lower valve body sidewall 326 is shaped to have a gradually decreasing diameter, that is, the distance from the outer surface of the lower valve body sidewall 326 to the axis gradually decreases. In this embodiment, the outer surface of the upper valve body sidewall 325 is a partial cylindrical surface, and the outer surface of the lower valve body sidewall 326 has a partial spherical shape. Since the valve body sidewall 323 extends about the axis x in a circumferential direction by about 90°, the upper valve body sidewall 325 and the lower valve body sidewall 326 form an incomplete cylindrical shape and an incomplete spherical shape in the circumferential direction. In some other embodiments, the outer surface of the lower valve body sidewall 326 may also has a partial conical shape, or other similar shapes.

The seal 218 is an annular seal, which is integrally formed on the valve body sidewall 323 by means of an injection molding process and slightly protrudes outwardly from the valve body sidewall 323 for contact with the housing sidewall of the housing 101. In this embodiment, the shape and size of the seal 218 correspond to those of the valve body sidewall 323, that is, and the shape of a sealing surface of the seal 218 is closed and is consistent with the shape of the valve body sidewall 323. A height of the seal 218 is substantially equal to a distance between the valve body top portion 321 and the valve body bottom portion 322, and a width of the seal 218 is substantially equal to a width of the valve body sidewall 323. Also, the shape and size of the seal 218 substantially correspond to those of the housing opening 238. Therefore, depending on the shape and size requirements of the housing opening 238, the seal 218 and the valve body 208 can be designed to nearly match the shape and size of the housing opening 238, so that the structure is compact and no space is wasted. In this embodiment, the seal 218 is integrally formed on the valve body sidewall 323 by means of an insert injection molding process without the need for an additional seal assembly mounting structure, thereby further facilitating a mounting process of the valve body 208 and the seal 218.

Figure 4A:
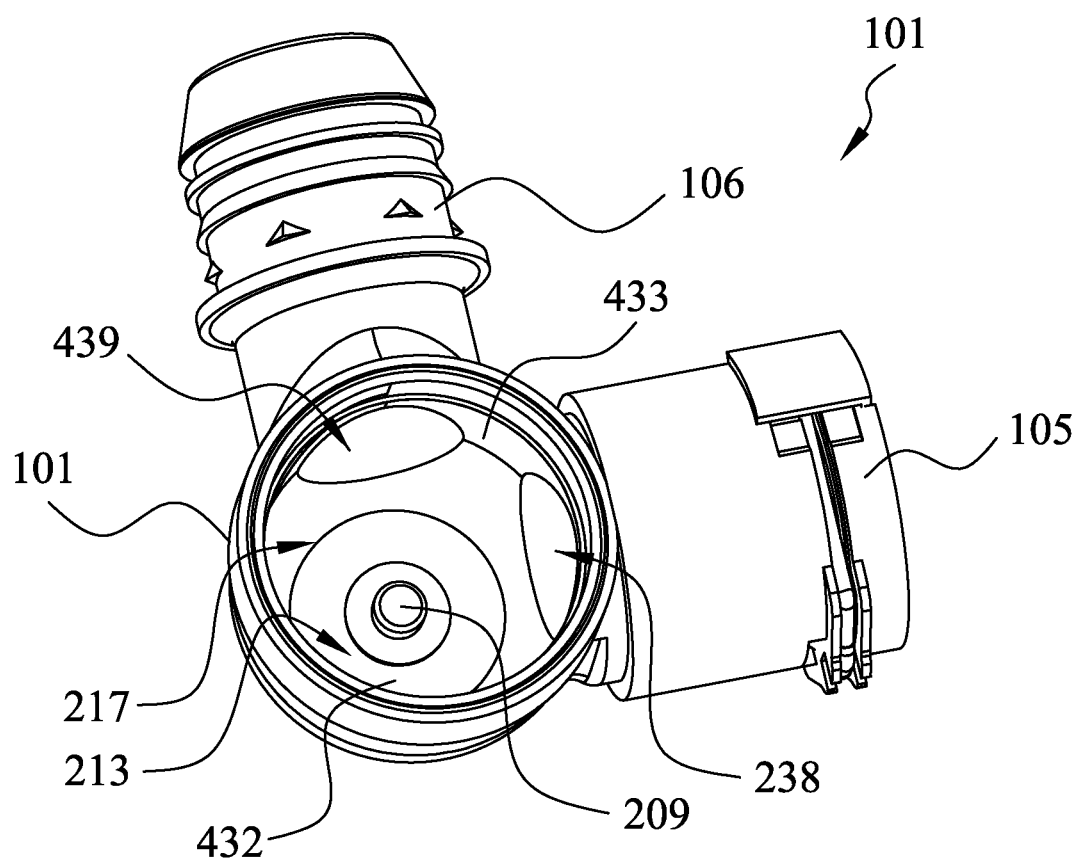
FIG. 4A is a structural perspective diagram of a housing in the valve shown in FIG. 1 when viewed from top.
Figure 4B:
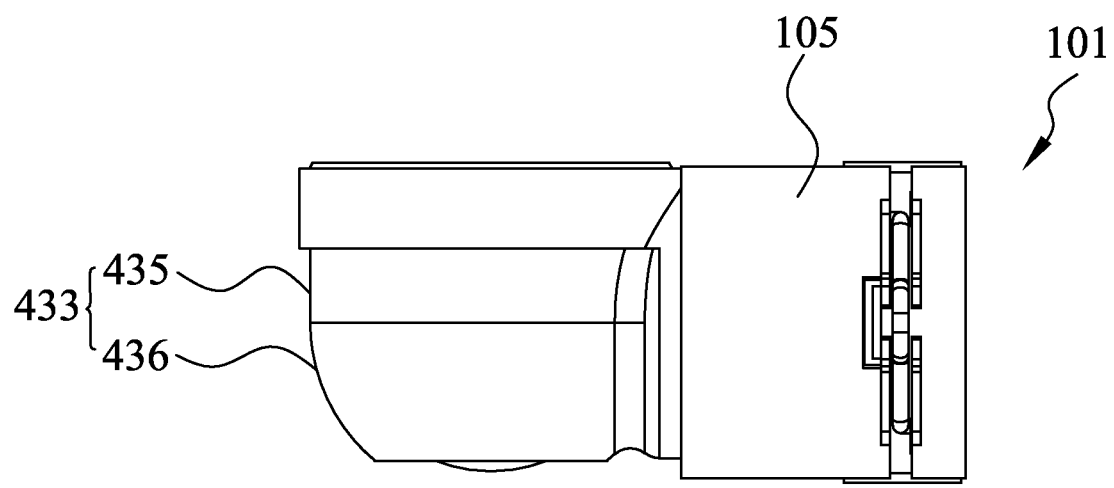
FIG. 4B is a front view of the housing of FIG. 4A.

FIGS. 4A and 4B show the specific structure of the housing 101, wherein FIG. 4A is a structural perspective diagram of the housing 101 when viewed from the top, and FIG. 4B is a front view of the housing 101.

As shown in FIGS. 4A and 4B, the housing 101 comprises a housing sidewall 433 and a housing bottom portion 432. The housing bottom portion 432 is connected to a bottom of the housing sidewall 433, and a generally circular mounting port 217 is formed on a top of the housing sidewall 433. The housing sidewall 433 and the housing bottom portion 432 together form a housing cavity 213 that communicates with the mounting port 217. The housing sidewall 433 has housing openings 238 and 439, wherein the housing opening 238 communicates with the fluid pipeline 105, and the housing opening 439 communicates with the fluid pipeline 106. The support shaft 209 extends from the housing bottom portion 432 towards the housing cavity 213 and is connected to the support shaft hole 319 in the valve body 208.

The housing sidewall 433 comprises an upper housing sidewall 435 and a lower housing sidewall 436, and the upper housing sidewall 435 is smoothly connected to and located above the lower housing sidewall 436. In order to facilitate machining and saving on materials, a thickness of the housing sidewall 433 is uniform, that is, the outer surface and an inner surface of the housing sidewall 433 have substantially the same shape. As an example, the upper housing sidewall 435 is in a cylindrical shape, and a bottom of the upper housing sidewall 435 extends smoothly towards the housing cavity 213 until it is connected to an edge of the housing bottom portion 432 to form the lower housing sidewall 436. In this embodiment, the shape and size of the housing sidewall 433 match those of the valve body sidewall 323, for example, an inner surface of the upper housing sidewall 435 and the outer surface of the upper valve body sidewall 325 are coaxial cylindrical surfaces, and an inner surface of the lower housing sidewall 436 and the outer surface of the lower valve body sidewall 326 are concentrical partial spherical surfaces, such that the seal 218 on the valve body sidewall 323 can abut against the housing sidewall 433. In this embodiment, when the valve body 208 is in the closed position, the seal 218 encloses the housing opening 238 and abuts against the housing sidewall 433 surrounding the housing opening 238, such that the valve body sidewall 323 can seal and close the housing opening 238. When the valve body 208 is in the open position, the seal 218 abuts against different portions of the housing sidewall 433, and the valve body sidewall 323 no longer closes the housing opening 238, such that the housing openings 238 and 439 communicate with each other via the housing cavity 213 inside the housing 101, and thus the fluid pipeline 105 and the fluid pipeline 106 communicate with each other. It should be noted that in some other embodiments, the shape and size of the housing sidewall 433 do not need to match those of the valve body sidewall 323, as long as the shape and size of the seal 218 match those of the housing opening 238.

In the embodiment of the present disclosure, since the housing sidewall 433 and the valve body sidewall 323 have an upper cylindrical half and a lower spherical half contracting inwardly, a radial size of the housing cavity 213 gradually decreases from top to bottom, facilitating the mounting of the valve body 208 directly from the mounting port 217 into the housing cavity 213 of the housing 101. Since the seal 218 is directly formed integrally with the valve body 208 by means of the injection molding process, after the valve body 208 is inserted into the housing cavity 213 of the housing 101, a sealing function of the seal 218 can be realized by dimensional matching without the need for additional assemblies for mounting the seal, such that the machining process is simple and easy to implement, and the structure is compact. Also, the spherical shapes of the housing sidewall 433 and the valve body sidewall 323 may also reduce the flow resistance of a coolant fluid in the housing cavity 213.

Figure 5A:
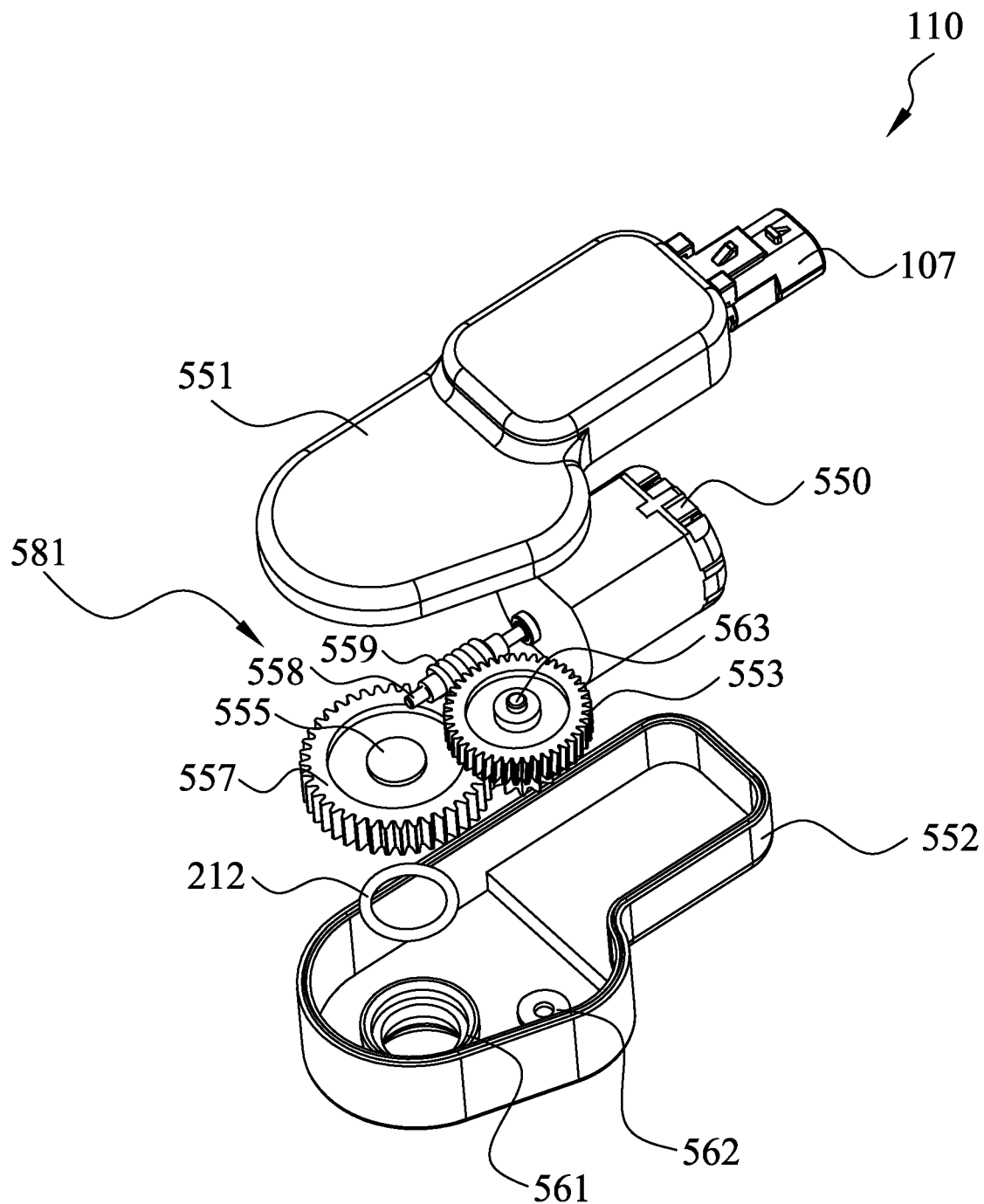
FIGS. 5A and 5B are exploded structural diagrams of an actuator mechanism of the valve shown in FIG. 1 when viewed from two different perspectives.
Figure 5B:
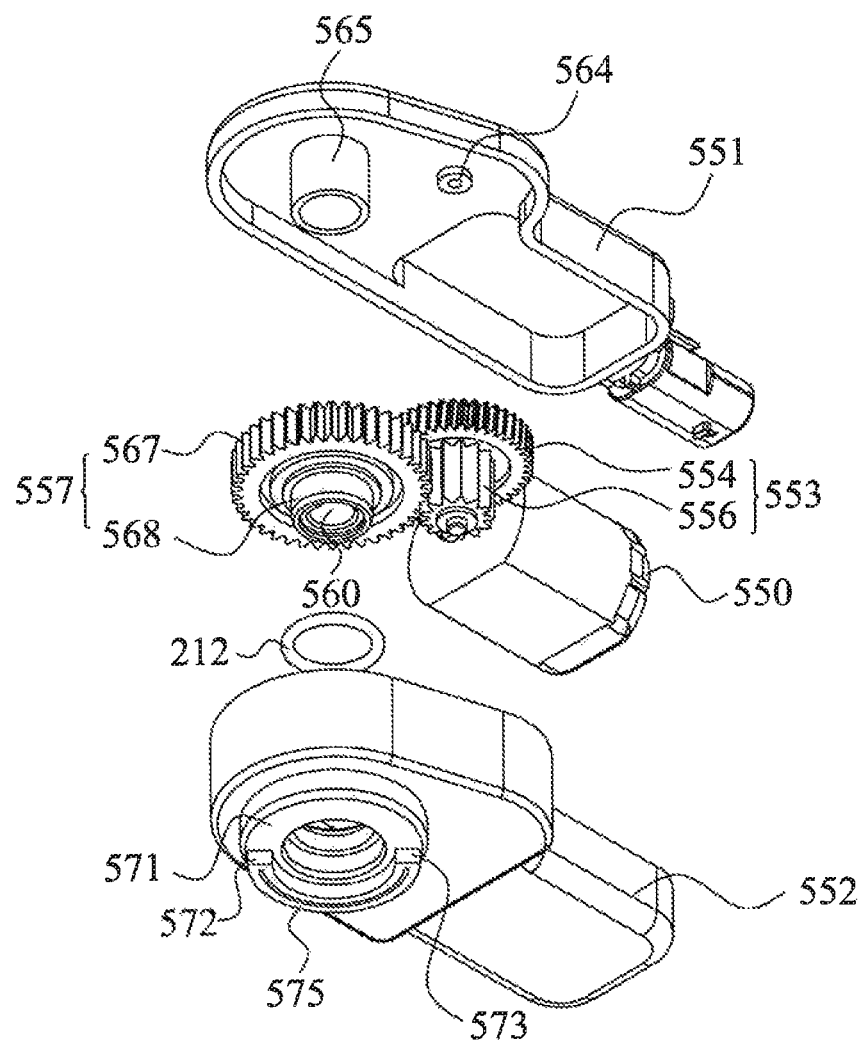

FIGS. 5A and 5B are exploded structural perspective diagrams of the actuator mechanism 110 when viewed from two perspectives to show the specific structure of the actuator mechanism 110. As shown in FIGS. 5A and 5B, the actuator mechanism 110 comprises a box-shaped part 102. The box-shaped part 102 comprises an upper box-shaped part 551 and a lower box-shaped part 552, and a space for accommodating internal assemblies is formed between the upper box-shaped part 551 and the lower box-shaped part 552. The internal assemblies include the electric motor 550 and the transmission assembly 581, the electric motor 550 is connected to an external power source and a control circuit via a communication connector 107, and the transmission assembly 581 drives the rotating shaft 215 extending into the box-shaped part 102 to rotate, so as to drive the valve body 208 to rotate.

Specifically, the transmission assembly 581 comprises a worm 559, a first gear 553, and a second gear 557, wherein the worm 559 is disposed on a driving shaft 558 of the electric motor 550 and rotates as the driving shaft 558 rotates. The first gear 553 comprises an upper gear 554 and a lower gear 556, which are connected via the same shaft 563, to achieve synchronous rotation of the two gears. In this embodiment, the upper gear 554 is configured to engage with the worm 559 so as to be driven by the worm 559 and to cause the lower gear 556 to rotate synchronously. The second gear 557 comprises a toothed portion 567 and a hollow cylindrical portion 568 extending downwardly from a lower side of the toothed portion 567. The toothed portion 567 and the hollow cylindrical portion 568 rotate together. In this embodiment, the toothed portion 567 is configured to engage with the lower gear 556 of the first gear 553 so as to be driven by the lower gear 556, and the hollow cylindrical portion 568 also rotates therewith. A receiving channel 560 is provided in the hollow cylindrical portion 568 to receive the rotating shaft 215 and to drive the rotating shaft 215 to rotate together, thereby causing the valve body 208 rotate. As an optional example, the rotating shaft 215 and an inner wall of the receiving channel 560 are provided with matched cut surfaces to enable the hollow cylindrical portion 568 to drive the rotating shaft 215 to rotate.

As shown in FIGS. 5A and 5B, the lower box-shaped part 552 is provided with a through hole 561 penetrating through the lower case 552, and the through hole 561 may accommodate the hollow cylindrical portion 568 of the second gear 557 to fix the second gear 557 at a preset position in the box-shaped part 102. A second sealing ring 212 is provided between the hollow cylindrical portion 568 and a wall of the through hole 561. The second sealing ring 212 may further prevent the coolant in the housing 101 from seeping into the box-shaped part 102 from the through hole 561 thereby affecting the operation of the electric motor 550 and the transmission assembly 581. A top of the second gear 557 is provided with a protrusion 555, the protrusion 555 is configured to engage with a cylinder 565 extending downwardly out of a bottom of the upper box-shaped part 551 to press the second gear 557 against the second sealing ring 212, and to fix the second gear 557 in an axial direction of the second gear 557.

A lower surface of the lower box-shaped part 552 is provided with a base 571 extending downwardly and surrounding the through hole 561. The housing 101 is fixedly connected to the actuator mechanism 110 together via the base 571 to prevent the seeping of the coolant from the housing 101. As an example, the housing 101 is fixedly connected to the base 571 by means of a welding process, and in such a connecting way, there is no need to provide an additional sealing structure between the housing 101 and the actuator mechanism 110. The lower surface of the base 571 is provided with a semicircular limiting boss 575 further protruding downwardly, and end portions of two sides of the limiting boss 575 are provided with stop walls 572 and 573 which are substantially perpendicular to the lower surface of the base 571. When the rotating shaft 215 of the valve body 208 passes through the through hole 561 and is received by the hollow cylindrical portion 568 of the second gear 557, the second gear 557 can rotate to drive the rotating shaft 215 to rotate, thereby rotating the valve body 208. As the valve body 208 rotates, the valve body top portion 321 of the valve body 208 rotates between the stop walls 572 and 573 of the limiting boss 575. When the valve body 208 rotates to its closed position, the limiting sidewall 328 of the valve body top portion 321 abuts against the stop wall 573 of the limiting boss 575 (see FIGS. 7A and 7B); and when the valve body 208 rotates to its open position, the limiting sidewall 329 of the valve body top portion 321 abuts against the stop wall 572 of the limiting boss 575 (see FIGS. 8A and 8B). It will be appreciated by those skilled in the art that complementary positioning structures, such as male-female structures, may also be provided between the housing 101 and the lower box-shaped part 552, such that the housing 101 and the lower box-shaped part 552 can be connected according to predetermined positions. In this way, the valve body 208 may exactly close the housing opening 238 in the housing 101 when restrained in the closed position by the stop wall 573.

Holes 564 and 562 for fixing upper and lower ends of the shaft 563 are formed in corresponding positions of the upper box-shaped part 551 and the lower box-shaped part 552 respectively, so that the shaft 563 can be fixed in the box-shaped part 102 and the position of the first gear 553 can be then fixed. In this embodiment, there is no need to provide an additional structure for fixing the electric motor 550, and a portion of the box-shaped part 102 is directly shaped to exactly accommodate the electric motor 550. Therefore, the electric motor 550, the first gear 553 and the second gear 557 can all be fixedly provided in the box-shaped part 102 without the need for any additional complicated mounting structure, and are convenient to mount.

Figure 6A:
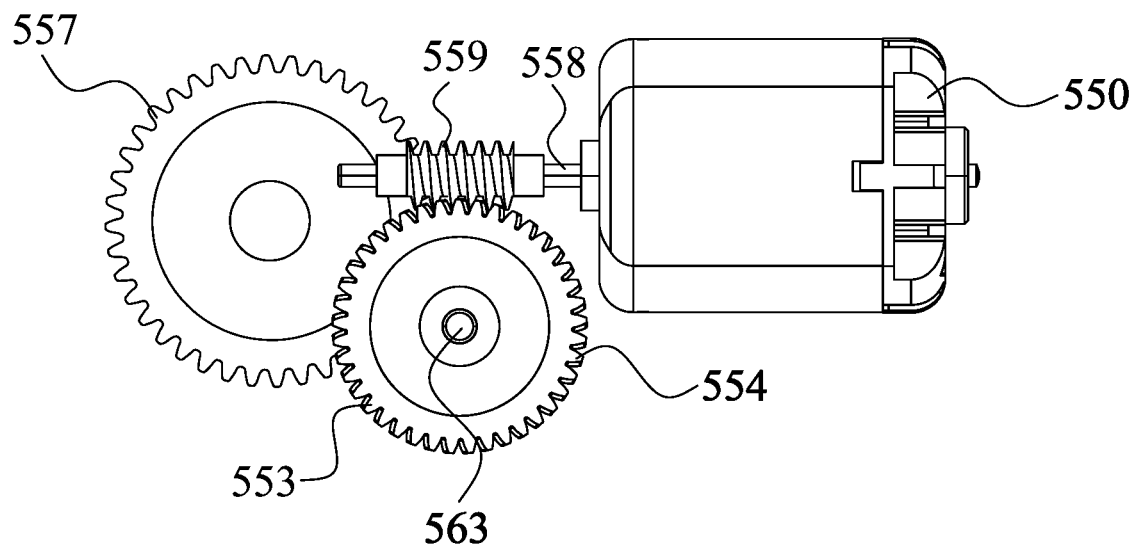
FIG. 6A is a top view of a transmission assembly and an electric motor shown in FIG. 5A.
Figure 6B:
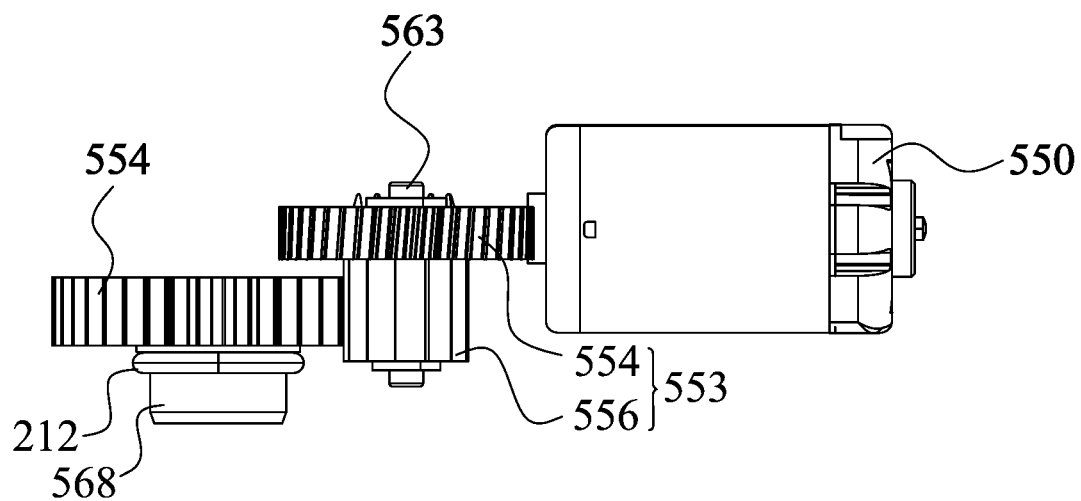
FIG. 6B is a front view of the transmission assembly and the electric motor shown in FIG. 5A.

FIG. 6A shows a top view of the transmission assembly 581 and the electric motor 550, and FIG. 6B shows a front view of the transmission assembly 581 and the electric motor 550, for illustrating the specific operation process of the transmission assembly 581.

As shown in FIGS. 6A and 6B, the first gear 553 is provided on the side of the worm 559, the second gear 557 is provided in front of the worm 559 and the first gear 553, and the second gear 557 is located below the worm 559 and the first gear 553, such that the worm 559, the first gear 553 and the second gear 557 are arranged in a substantially triangular shape. In this embodiment, first-stage speed reduction in rotation of the driving shaft 558 is achieved by engaging the worm 559 with the second gear 557. In the first gear 553, a diameter of the upper gear 554 is greater than that of the lower gear 556, and the number of teeth of the upper gear 554 is greater than that of the lower gear 556. The number of teeth of the second gear 557 is also greater than that of the lower gear 556. Therefore, when the first gear 553 rotates, the upper gear 554 and the lower gear 556 synchronously rotate around the shaft 563, and the lower gear 556 having the smaller number of teeth then drives the second gear 554 to rotate, achieving second-stage speed reduction in the rotation of the driving shaft 558.

By designing the transmission assembly 581 such that the worm and the two gears are arranged in the triangular shape and by using gears with low profiles, two-stage speed reduction of the driving shaft 558 can be achieved, and the reduction requirement of the driving shaft 558 is ensured on the premise that the space required for the arrangement is reduced as much as possible and the structure of the transmission assembly 581 is simplified.

Figure 7A:
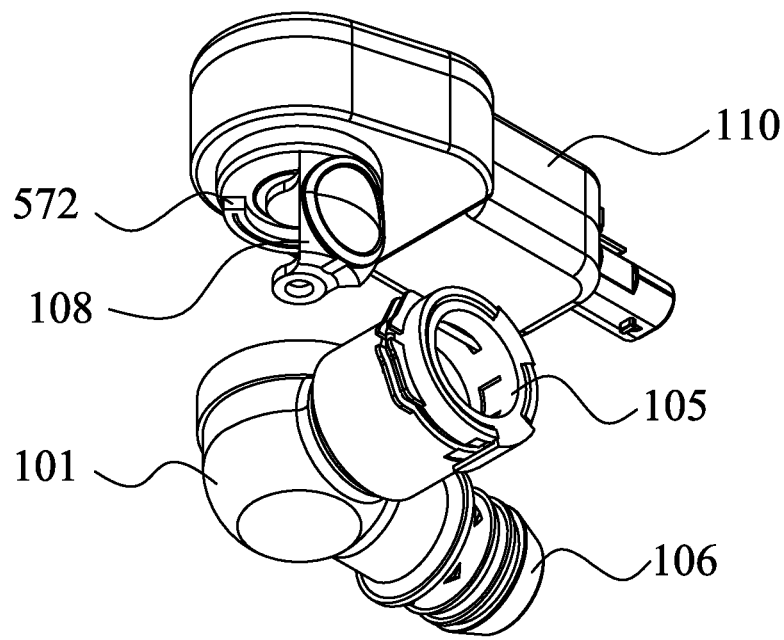
FIGS. 7A and 7B are partial exploded structural perspective diagrams of the valve shown in FIG. 1 closing a fluid pipeline when viewed from two different perspectives.
Figure 7B:
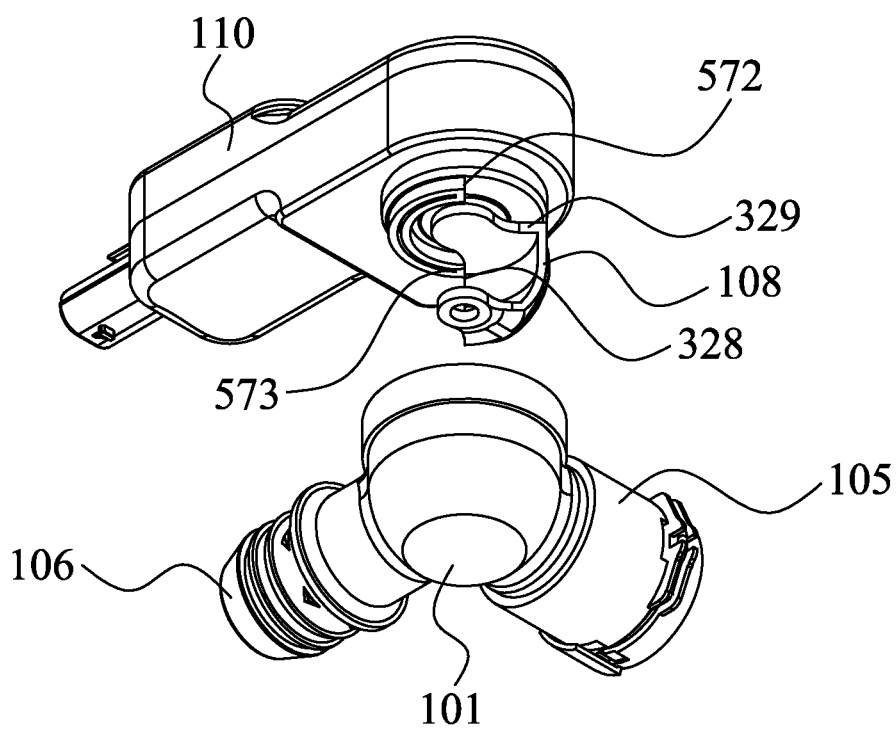
Figure 8A:
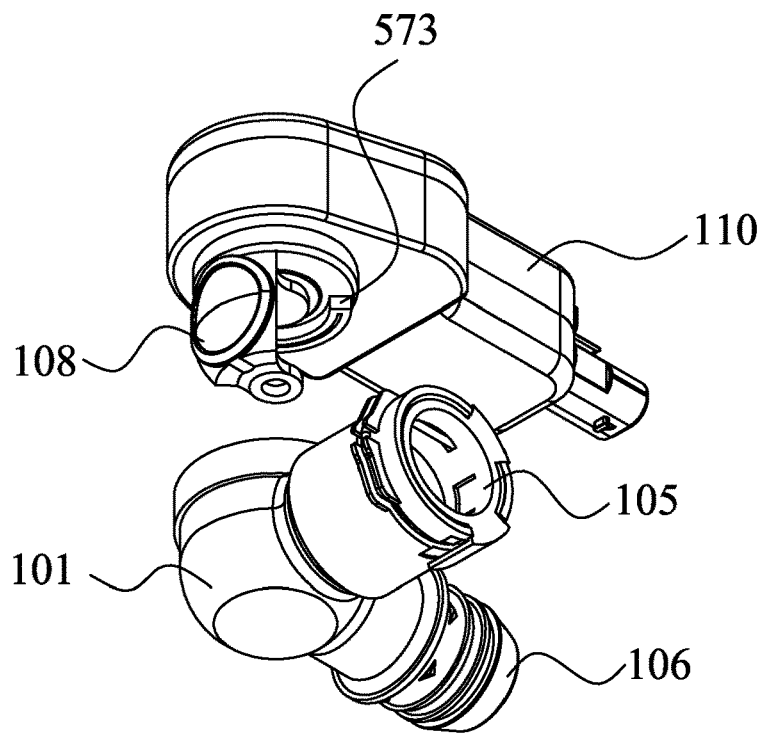
FIGS. 8A and 8B are partial exploded structural perspective diagrams of the valve shown in FIG. 1 opening the fluid pipeline when viewed from two different perspectives.
Figure 8B:
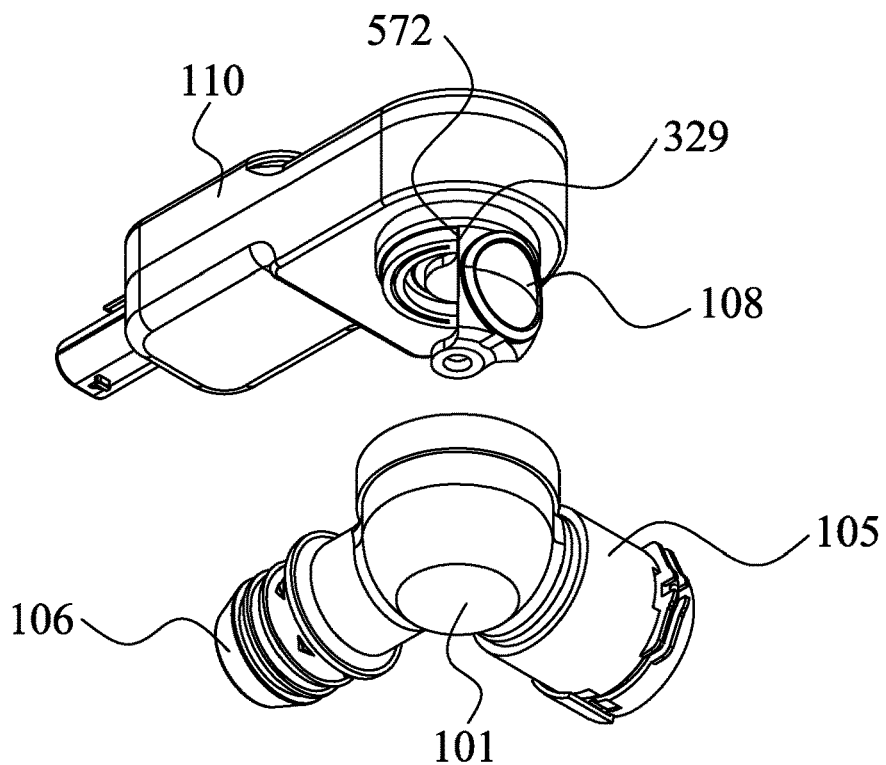

FIGS. 7A and 7B show partial exploded structural perspective diagrams when viewed from two perspectives when the fluid pipeline 105 is closed, for showing the closed position of the valve body 208 when the valve body 208 closes the housing opening 238. FIGS. 8A and 8B show partial exploded structural perspective diagrams when viewed from two perspectives when the fluid pipeline 105 is opened, for showing the open position of the valve body 208 when the valve body 208 opens the housing opening 238.

As shown in FIGS. 7A and 7B, when the valve body 208 is in its closed position, the valve body sidewall 323 of the valve body 208 is aligned with the housing opening 238 in the housing sidewall 433 of the housing 101 to close the housing opening 238. In the state shown in the figures, the seal 218 on the valve body sidewall 323 is aligned with and abuts against the housing sidewall 433 surrounding the housing opening 238, so that the valve body sidewall 323 and the seal 218 can seal and close the housing opening 238 and then close the fluid pipeline 105.

In the state shown in the figures, the limiting sidewall 328 of the valve body 208 abuts against the stop wall 573 of the lower box-shaped part 552, and the valve body 208 cannot rotate towards the stop wall 573 but can only rotate towards the stop wall 572.

When the actuator mechanism 110 receives a control signal for opening the valve 100, the driving shaft 558 of the electric motor 550 rotates in the reverse direction (or counterclockwise), and the valve body 208 rotates towards the stop wall 572 until the valve body 208 moves to the open position as shown in FIGS. 8A and 8B.

As shown in FIGS. 8A and 8B, when the valve body 208 is in its open position, the valve body sidewall 323 of the valve body 208 is offset from the housing opening 238 in the housing sidewall 433 of the housing 101 to open the housing opening 238. In the state shown in the figures, the seal 218 on the valve body sidewall 323 moves along with the valve body 208 such that it is aligned with different portions of the housing sidewall 433 without affecting the flow of the coolant from the fluid pipeline 106 to the fluid pipeline 105 through the housing cavity 213 in the housing 101.

In the state shown in the figures, the limiting sidewall 329 of the valve body 208 abuts against the stop wall 572 of the lower box-shaped part 552, and the valve body 208 cannot rotate towards the stop wall 572 but can only rotate towards the stop wall 573.

Similarly, when the actuator mechanism 110 receives a control signal for closing the valve 100, the driving shaft 558 of the electric motor 550 rotates in a forward direction (or clockwise), and the valve body 208 rotates towards the stop wall 573 until the valve body 208 moves to the closed position as shown in FIGS. 7A and 7B.

The valve 100 of this embodiment comprises an actuator mechanism 110, a valve body 208, and a housing 101, the structure for connecting the actuator mechanism 110 to the housing 101 is provided inside the housing 101, and the structure for connecting the valve body 208 to the housing 101 is also provided inside the housing 101. Such an arrangement makes the valve 100 compact in structure and have small dimensional height. Since the size of the valve body 208 and the seal 218 corresponds to that of the housing opening, the volumes of the valve body 208 and the seal 218 may be made as small as possible under the condition that the desired size of the housing opening is determined. Furthermore, the valve body 208 and the seal 218 of the valve 100 may be mounted together into the housing 101 via the mounting port 217 and are convenient to assemble, so that automatic assembly and batch manufacturing is possible.

It should be noted that although the valve 100 in this embodiment comprises only two fluid pipelines, more fluid pipelines may also be provided according to actual needs, as long as the structures of the housing opening and the valve body are correspondingly configured, and a rotation angle of the valve body is controlled.

Figure 9:
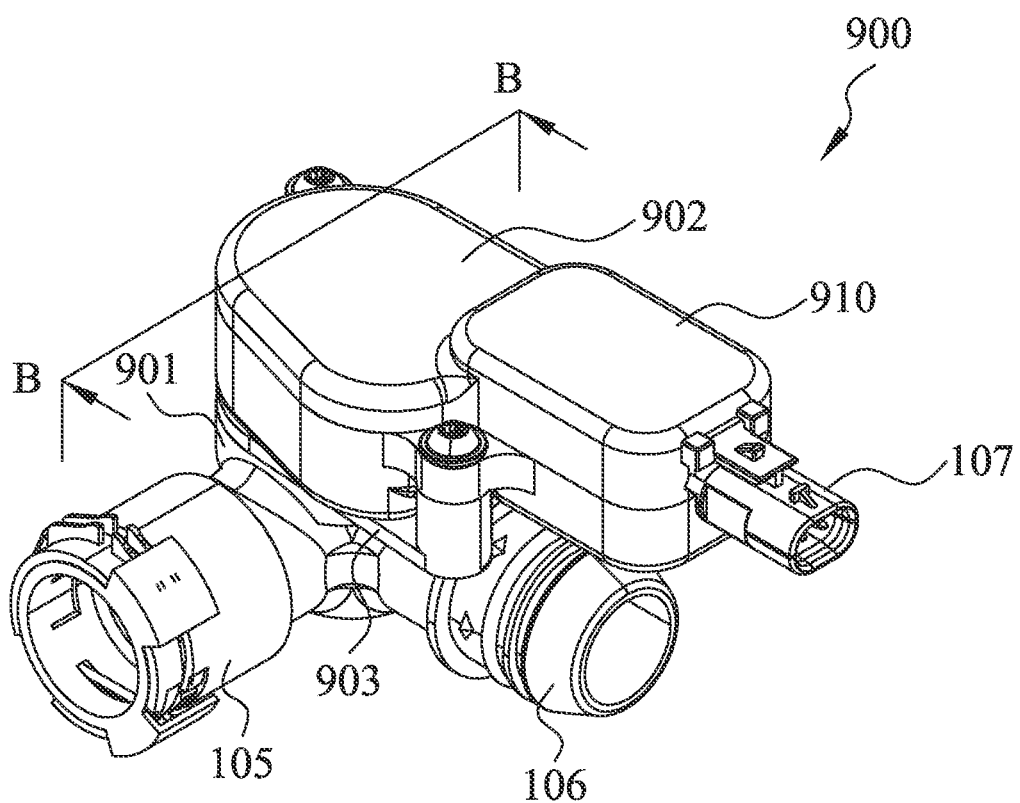
FIG. 9 is a structural perspective diagram of a valve according to another embodiment of the present disclosure.

FIG. 9 is a structural perspective diagram of a valve 900 according to another embodiment of the present disclosure, for showing an overall structure of the valve 900. As shown in FIG. 9, the valve 900 also comprises an actuator mechanism 910 and a housing 901. The actuator mechanism 910 comprises a box-shaped part 902 and a communication connector 107, and the housing 901 is provided with fluid pipelines 105 and 106. The valve 900 has substantially the same structure as the valve 100. Different from the valve 100, a valve cover 903 is further included between the actuator mechanism 910 and the housing 901, and the actuator mechanism 910 is provided on the housing 901 via the valve cover 903.

Figure 10A:
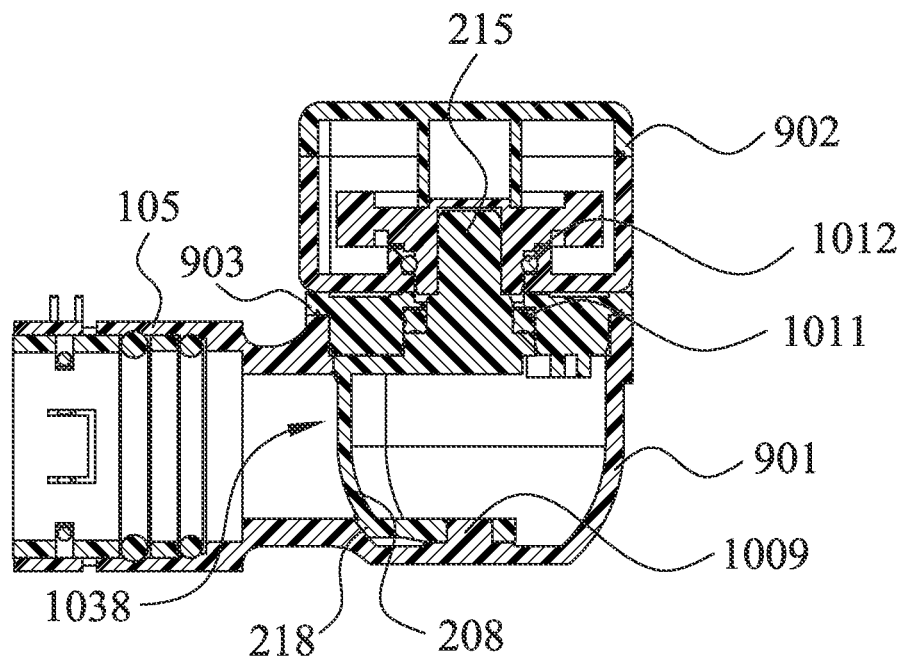
FIG. 10A is a cross-sectional view of the valve shown in FIG. 9 taken along line B-B.
Figure 10B:
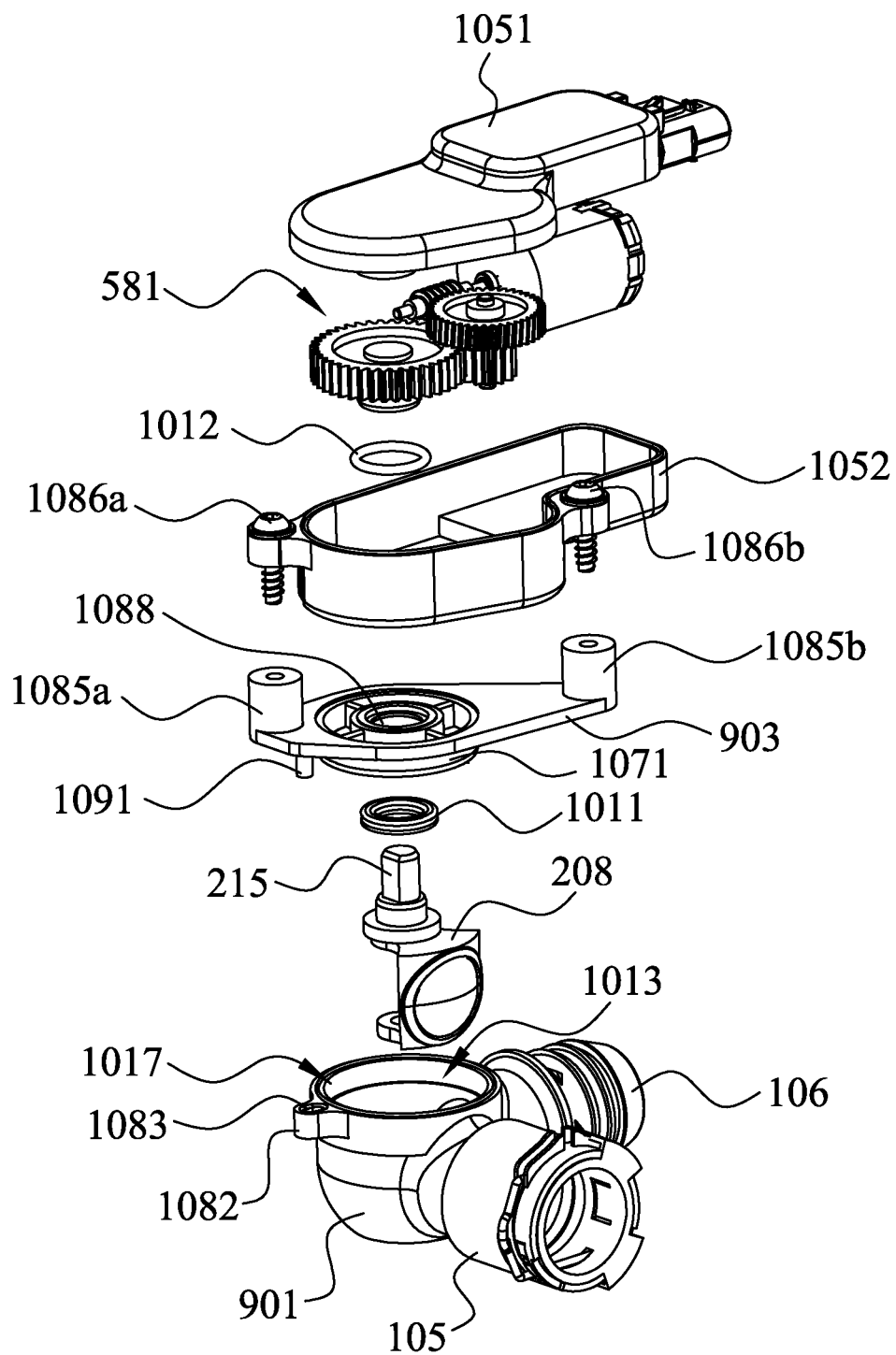
FIGS. 10B and 10C are exploded structural perspective diagrams of the valve shown in FIG. 9 when viewed from two different perspectives.
Figure 10C:
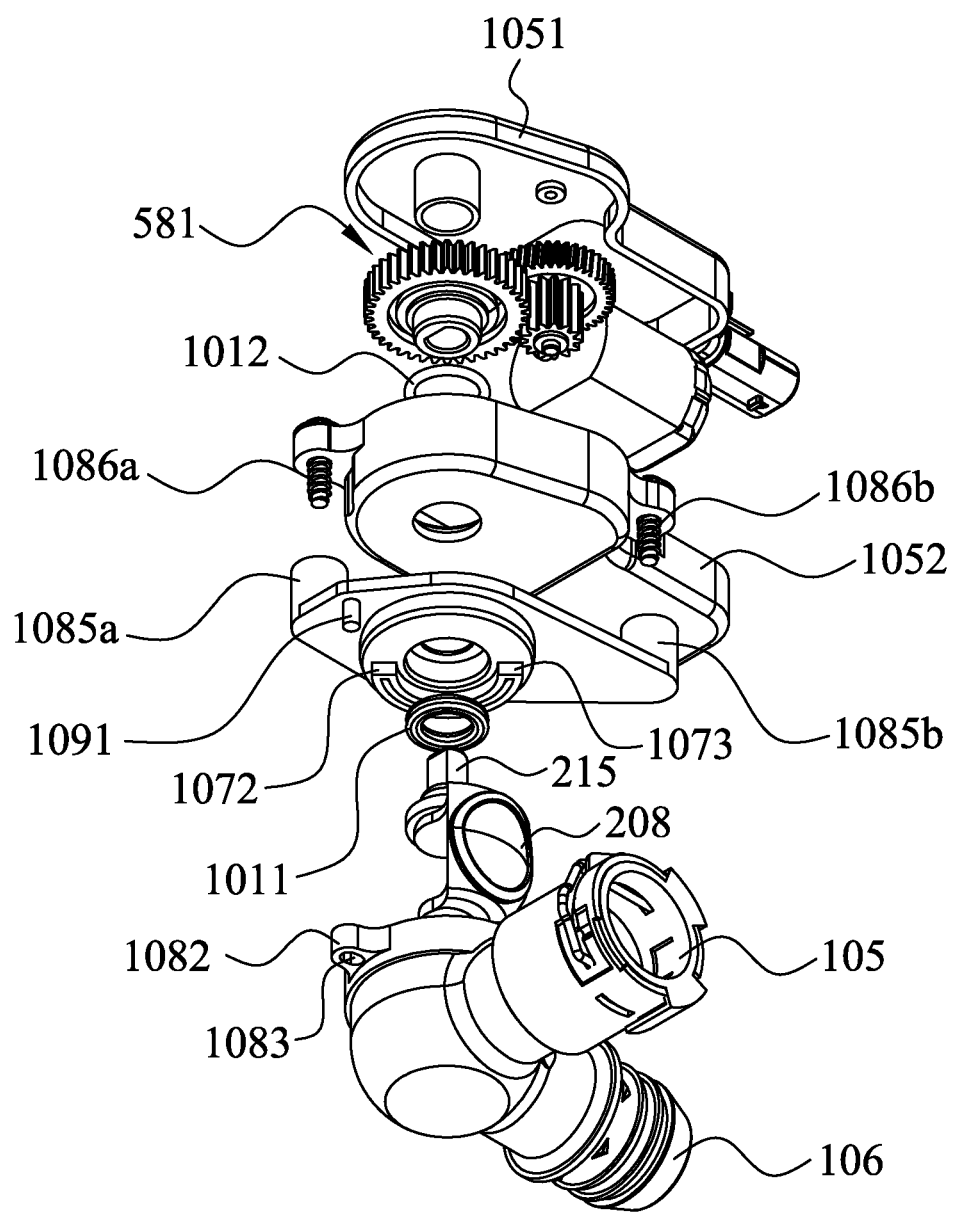

FIGS. 10A-10C show the specific structure of the valve 900, wherein FIG. 10A is a cross-sectional view of the valve 900 shown in FIG. 9 taken along the line B-B, and FIGS. 10B and 10C are exploded structural perspective diagrams of the valve 900 when viewed from two perspectives.

As shown in FIGS. 10A-10C, the valve 900 also comprises a valve body 208 and a seal 218. The valve body 208 is mounted into the housing cavity 1013 of the housing 901 via a mounting port 1017. The valve body 208 and the seal 218 have the same structure as the valve body 208 and the seal 218 in the valve 100, which will not be described in detail herein. The housing 901 is also provided with a housing opening 1038 communicating with the fluid pipeline 105, and is provided with a support shaft 1009 connected to the valve body 208. In this embodiment, a first sealing ring 1011 is provided between a rotating shaft 215 of the valve body 208 and the valve cover 903 to prevent the coolant fluid in the housing 901 from seeping between the valve cover 903 and the valve body 208. A second sealing ring 1012 is still provided between the rotating shaft 215 of the valve body 208 and the transmission assembly in the box-shaped part 902.

As shown in FIGS. 10B and 10C, the box-shaped part 902 also comprises an upper box-shaped part 1051 and a lower box-shaped part 1052, and the transmission assembly 581 and the electric motor are accommodated between the upper box-shaped part 1051 and the lower box-shaped part 1052. The valve cover 903 is provided with a through hole 1088, and the rotating shaft 215 of the valve body 208 may pass through the through hole 1088 and then extend into the actuator mechanism 910 for connection to the transmission assembly 581. In this embodiment, a mounting base 1071 is no longer provided at a bottom of the lower box-shaped part 1052, but is provided at a bottom of the valve cover 903. The housing 901 is connected to the mounting base 1071 at the bottom of the valve cover 903 by means of a welding process such that the valve cover 903 can close the mounting port 1017 of the housing 901. The mounting base 1071 is also provided with stop walls 1072 and 1073, the rotation of the valve body 208 between the open position and the closed position is limited by engaging the limiting sidewalls 328 and 329 of the valve body 208 with the stop walls 1072 and 1073. In this embodiment, an edge of the valve cover 903 is further provided with a downwardly extending positioning column 1091, a top of the housing 901 is correspondingly provided with an outwardly protruding lug portion 1082, and the lug portion 1082 is provided with a positioning hole 1083. When the valve cover 903 and the housing 901 are connected together, the valve cover 903 and the housing 901 may be positioned and mounted by inserting the positioning column 1091 into the positioning hole 1083, and the housing opening in the housing 901 is then closed or opened when the stop walls 1072 and 1073 of the valve cover 903 can exactly restrict the valve body 208 from rotating to corresponding positions where it abuts against the stop walls 1072 and 1073.

In this embodiment, the lower box-shaped part 1052 is connected to the valve cover 903 via a fastening structure. As an example, two ends of the valve cover 903 are respectively provided with protruding bosses extending upwardly, the bosses are provided with mounting holes 1085a and 1085b, and at corresponding positions of a head and a side surface of the lower box-shaped part 1052 are respectively provided with fasteners 1086a and 1086b. The lower box-shaped part 1052 may be connected to the valve cover 903 by means of the interaction between the fasteners 1086a, 1086b and the mounting holes 1085a, 1085b.

In this embodiment, although compared with the valve 100, the valve 900 further comprises the valve cover 903, and thus has a slightly larger occupied space than the valve 100, the actuator mechanism 910 is removable due to the connection between the valve cover 903 and the actuator mechanism 910 via the fasteners. Moreover, the valve cover 903 and the housing 901 can be connected at determined position, which is more convenient for mounting.

The free space inside the battery pack is usually not much, but in order to ensure the temperature regulating effect of the coolant on battery assemblies, the flow rate of the circulating coolant cannot be too low. Therefore, the valve is provided in the battery pack, and the size of the valve is made as small as possible on the premise of ensuring the necessary circulation area of the coolant in the valve and good sealing performance.

In the valve of the present disclosure, the support shaft on the housing protrudes towards the interior of the housing, and the driving shaft on the valve body extends towards the interior of the actuator mechanism, reducing the height of the valve. In addition, the valve of the present disclosure can achieve the sealing performance of the valve only by using three seals, and the number of required parts is small, so that the valve is more compact in structure and has no redundant structures, and the space occupied by the valve is small under the condition that the wall thicknesses of the valve body and the housing are determined. Moreover, in the present disclosure, the valve body sidewall of the valve body and the housing sidewall of the housing are both further shaped to have a spherical half and a cylindrical half, and the valve body sidewall is almost the same as the housing opening in size, so that the size of the valve body is reduced on the premise of ensuring the size of the housing opening. Furthermore, the seal may be integrated on the valve body sidewall, and can be mounted by directly inserting same into the mounting port, which is convenient to mount, thereby guaranteeing the sealing performance of the valve and making the structure of the valve more compact. In this way, the valve of the present disclosure has the advantages of small size, good sealing performance, simple structure and convenient assembly.

Although the present disclosure will be described with reference to the specific embodiments shown in the accompanying drawings, it should be understood that the valve and the seal of the present disclosure can have many variations without departing from the spirit, scope and background of the teachings of the present disclosure. Those of ordinary skill in the art will also appreciate that there are different ways to alter the structure in the embodiments disclosed in the present disclosure, and all the alterations fall within the spirit and scope of the present disclosure and claims.

The invention claimed is:
1. A valve, comprising:
a housing, the housing having a housing cavity and at least two housing openings, and the at least two housing openings communicating with the housing cavity;
a valve body, the valve body being rotatably provided in the housing cavity of the housing, wherein the valve body comprises a valve body top portion, a valve body bottom portion and a valve body sidewall, the valve body top portion is connected to a rotating shaft, the valve body sidewall is connected between the valve body top portion and the valve body bottom portion, the valve body sidewall extends circumferentially around an axis of the rotating shaft, and the valve body sidewall is configured to be capable of opening or closing at least one of the at least two housing openings as the valve body is rotated around the rotating shaft; and a seal, the seal being provided on the valve body sidewall, and the seal being configured to match with the housing such that the valve body sidewall is capable of sealing and closing the at least one of the at least two housing openings, wherein the valve body sidewall comprises an upper valve body sidewall and a lower valve body sidewall which are connected to each other, the upper valve body sidewall is connected to the valve body top portion, and the lower valve body sidewall is connected to the valve body bottom portion, and wherein an outer surface of the upper valve body sidewall is a partial cylindrical surface, and an outer surface of the lower valve body sidewall is shaped to curve inwardly toward the axis in a direction from top to bottom, such that a distance between the axis and the lower valve body sidewall is smaller than a distance between the axis and the upper valve body sidewall.

2. The valve according to claim 1, wherein the housing has a housing bottom portion and a housing sidewall, the housing sidewall defines the housing cavity, the housing openings are provided in the housing sidewall, a bottom of the housing sidewall is connected to the housing bottom portion, a top of the housing sidewall forms a mounting port communicating with the housing cavity, and the valve body is mounted in the housing cavity via the mounting port;

wherein the housing sidewall comprises an upper housing sidewall and a lower housing sidewall, the upper housing sidewall is provided above the lower housing sidewall, the housing sidewall is configured to have a complementary shape with the valve body sidewall, and the seal is configured to be capable of abutting against the housing sidewall.

3. The valve according to claim 2, wherein the valve further comprises at least two fluid pipelines, the at least two fluid pipelines being provided, corresponding to the housing openings, outside the housing, and being integrally formed with the housing.

4. The valve according to claim 2, wherein the housing bottom portion is provided with a support shaft extending towards the housing cavity, the valve body bottom portion is provided with a shaft hole for receiving the support shaft, and the support shaft and the rotating shaft are coaxially arranged.

5. The valve according to claim 2, wherein the seal is integrally formed on the valve body sidewall by an injection molding process.

6. The valve according to claim 5, wherein the seal is an annular seal, which is shaped and dimensioned to be capable of enclosing the housing opening and abutting against the housing sidewall surrounding the housing opening when the valve body sidewall closes the housing opening.

7. The valve according to claim 2, wherein the outer surface of the lower valve body sidewall is a partial spherical surface, and an inner surface of the lower housing sidewall is a hemispherical surface.

8. The valve according to claim 7, wherein the valve body sidewall and the housing sidewall have a uniform thickness.

9. The valve according to claim 2, further comprising:
an actuator mechanism, the actuator mechanism comprising a transmission assembly, and the transmission assembly comprising:
a worm, the worm being configured to be connected to a driving shaft;
a first gear, the first gear having an upper gear and a lower gear which are capable of rotating synchronously, a number of teeth of the lower gear being less than that of the upper gear, and the upper gear engaging with the worm; and
a second gear, a number of teeth of the second gear being greater than that of the lower gear, and the second gear engaging with the lower gear of the first gear;
wherein the second gear is connected to the rotating shaft of the valve body to drive the rotating shaft to rotate.

10. The valve according to claim 9, wherein the actuator mechanism further comprises a box-shaped part, the box-shaped part being connected above the housing, the transmission assembly being provided in the box-shaped part, and the rotating shaft passing through the box-shaped part for connection to the second gear, wherein a first sealing ring is provided between the rotating shaft and the box-shaped part, and a second sealing ring is provided between the second gear and the box-shaped part.

11. The valve according to claim 10, further comprising:
a valve cover, wherein the valve cover is welded on the mounting port of the housing to close the mounting port, the box-shaped part is provided above the valve cover, and the rotating shaft of the valve body passes through the valve cover to extend into the box-shaped part.

12. The valve according to claim 11, wherein a bottom of the box-shaped part or the valve cover is provided with two stop walls which are capable of coming into contact with the top of the valve body, and the valve body top portion of the valve body rotates between the two stop walls.

* * * * *